UNITED STATES PATENT OFFICE.

MAXIMILIAN PAUL SCHMIDT, OF BIEBRICH, GERMANY, ASSIGNOR TO THE FIRM OF KALLE AND COMPANY, AKTIENGESELLSCHAFT, OF BIEBRICH, GERMANY.

MANUFACTURE OF VAT DYESTUFFS OR INITIAL PRODUCTS OF SAME.

1,209,212.  Specification of Letters Patent.  Patented Dec. 19, 1916.

No Drawing.  Application filed April 28, 1916.  Serial No. 94,237.

*To all whom it may concern:*

Be it known that I, MAXIMILIAN PAUL SCHMIDT, chemist, and a subject of the King of Saxony, residing at 18¹ Rathausstrasse, Biebrich-on-the-Rhine, Germany, have invented certain new and useful Improvements in the Manufacture of Vat Dyestuffs or Initial Products of Same, of which the following is a specification.

In the German patent specifications 253091, 253761 and 255642 it has been shown, that the vat dye-stuffs obtained from benzoquinone and aromatic amins can be converted into new dye-stuffs, which do not dye in the vat, by heating them in the presence of suitable solvents with or without the addition of metal-halogenids, as for instance chlorid of aluminum and so on.

Now I have found, that new vat dye-stuffs or valuable initial products of same may be obtained by heating the arylamino- or diarylamino-derivatives of halogenized benzoquinones in suitable solvents or diluents in the presence of metal-powders, especially copper-powder. The dye-stuffs obtainable according to the present invention are distinguished from the known products according to the above mentioned patent specifications by their property of dyeing in the vat and dissolving in sulfuric acid with a red color. Furthermore they do not present any fluorescence.

The invention may be illustrated by the following examples. The parts are by weight.

Example 1: 15 parts of 3.6-dichlor-1.4-dianilidobenzoquinone obtained by condensing chloranil with anilin (*cfr. Beilstein*, Vol. III., page 343) are heated during perhaps 10 hours in a reflux apparatus in 150 parts of nitrobenzene with 3 parts of copper-powder and 10 parts of dry acetate of sodium while stirring. After cooling, the mass is filtered and the residue purified by dissolving it in alkaline hydrosulfite. The solution is filtered and the new product of condensation precipitated by blowing air into the filtrate. The dyestuff is a yellowish brown powder soluble in nitrobenzene, dichlortoluene or similar solvents in the heat and soluble in concentrated sulfuric acid with a red color, crystallizes from nitrobenzene in big needles of a steel-blue tint and may be sublimated without decomposition. It dyes wool in the alkaline hydrosulfite vat in yellowish-brown tints.

Example 2: 15 parts of the condensation product obtained from 1 molecule of chloranil and 2 molecules of o-toluidin are treated in nitrobenzene with the addition of copper-powder and acetate of sodium in the manner described in Example 1. The obtained vat dye dissolves in concentrated sulfuric acid with a cherry-red coloration and crystallizes from nitrobenzene in thin yellowish-brown needles. The dyeing properties of the product are similar to those of the dyestuff according to Example 1.

Example 3: 214 parts of di-(chloranilido)-dichlorbenzoquinone, obtainable by condensing 2 molecules of 1-chloro-4-amino-benzene with 1-molecule chloranil, are heated for some hours in a stirring-autoclave at a temperature of 180-200° C. with 100 parts of shavings of iron, 100 parts of chalk and 2000 parts of water. The mass of reaction is then freed of the iron and chalk by boiling it with hydrochloric acid, filtered and well washed. The dye-stuff is extracted from the residue by treating it with a solution of alkaline hydrosulfite. The dye-stuff dissolves in concentrated sulfuric acid with a violet-red color and crystallizes from nitrobenzene in needles. It dyes wool with yellow tints. If in this example zinc is employed instead of iron and the mass is heated to 170-200° C., a similar dyestuff is obtained, dyeing wool with a more greenish-yellow coloration.

I claim:

1. Process of producing vat dye-stuffs or initial products of same, consisting in heating arylamino-derivatives of halogenized benzo-quinones with the addition of a metal-powder in the presence of a suitable solvent or diluent.

2. As new products the vat dye-stuffs or initial products obtainable by heating arylamino derivatives of halogenized benzoquinones with the addition of a metal-powder, being yellow to brown powders, showing no fluorescence, soluble in nitrobenzene, in sulfuric acid with a red color, forming a vat with alkaline reducing agents, from which wool is dyed yellow to brown tints.

3. As new products the vat dye-stuffs or initial products obtainable by heating phenylamino-derivatives of halogenized benzoquinones with the addition of a metal-powder, being yellow to brown powders, showing no fluorescence, soluble in nitrobenzene, in sulfuric acid with a red color, forming a vat with alkaline reducing agents, from which wool is dyed yellow to brown tints.

4. As new products the vat dye-stuffs or initial products obtainable by heating arylamino-derivatives of chlorobenzoquinones with the addition of a metal-powder, being yellow to brown powders, showing no fluorescence, soluble in nitrobenzene, in sulfuric acid with a red color, forming a vat with alkaline reducing agents, from which wool is dyed yellow to brown tints.

5. As new products the vat dye-stuffs or initial products obtainable by heating dichloro-anilidobenzoquinones with the addition of copper-powder, being yellowish brown powders, showing no fluorescence, soluble in nitrobenzene, in sulfuric acid with a red color, forming a vat with alkaline reducing agents, from which wool is dyed yellowish brown tints.

6. As a new product the vat dye-stuff obtainable by heating 3.6-dichlor-1.4-dianilidobenzoquinone with a metal-powder in a suitable solvent or diluent, being a yellowish-brown powder, soluble in nitrobenzene, dichlortoluene or similar solvents in the heat and crystallizing on cooling in the shape of needles of a metallic luster, soluble in concentrated sulfuric acid with a red color, giving with alkaline reducing agents a vat, from which wool is dyed with yellowish-brown tints.

In testimony whereof I have signed my name to this specification in the presence of two subscribing witnesses.

MAXIMILIAN PAUL SCHMIDT.

Witnesses:
    LUGUST ROTH,
    MORITZ WETZEL.